United States Patent [19]

Matsuda et al.

[11] Patent Number: 4,773,742
[45] Date of Patent: Sep. 27, 1988

[54] DISPLAY METHOD WITH FATLY ACID ESTER HOST MOLECULE

[75] Inventors: Hiroshi Matsuda, Yokohama; Masahiro Haruta, Funabashi; Yutaka Hirai, Tokyo; Yukuo Nishimura, Sagamihara; Ken Eguchi, Yokohama; Takashi Nakagiri, Tokyo, all of Japan

[73] Assignee: Canon Kabushiki Kaisha, Tokyo, Japan

[21] Appl. No.: 732,621

[22] Filed: May 10, 1985

[30] Foreign Application Priority Data

May 15, 1984 [JP] Japan .................................. 59-95577
May 15, 1984 [JP] Japan .................................. 59-95578

[51] Int. Cl.$^4$ ........................... G03G 5/02; G02F 1/01
[52] U.S. Cl. ...................................... 350/357; 252/600
[58] Field of Search ........................... 252/600; 350/357

[56] References Cited

U.S. PATENT DOCUMENTS

| | | | |
|---|---|---|---|
| 3,390,192 | 6/1968 | Hall et al. | 252/600 X |
| 3,697,592 | 10/1972 | Hall | 252/600 X |
| 3,806,229 | 4/1974 | Schoot et al. | 252/600 X |
| 4,175,838 | 11/1979 | Randin | 252/600 X |
| 4,212,518 | 7/1980 | Imataki et al. | 252/600 X |
| 4,249,013 | 2/1981 | Haddon et al. | 252/600 X |
| 4,312,992 | 1/1982 | Green | 549/59 |

FOREIGN PATENT DOCUMENTS 110717 6/1984 European Pat. Off. .
71380 9/1973 Japan .
32958 3/1975 Japan .
63950 5/1975 Japan .
136000 10/1975 Japan .
35587 3/1977 Japan .
55-41473 3/1980 Japan .
172891 10/1983 Japan .

OTHER PUBLICATIONS

Bulletin Chemical Society of Japan, F. Toda, et al.; "Clathrate Compound Formed by Utilizing Acetylenic Diol as a Host Molecule", No. 2, pp. 239-242 (1983).
Ser. No. 724,544, Apr. 18, 1985.
Ser. No. 724,299, Apr. 17, 1985.
Steven, J. H., et al. "Influence of Chemical Structure on the Monolayer Properties of Polycyclic Aromatic Molecules", Thin Solid Films, vol. 99 (1983) 71-79.

Primary Examiner—Matthew A. Thexton
Assistant Examiner—Catherine S. Kilby
Attorney, Agent, or Firm—Fitzpatrick, Cella, Harper & Scinto

[57] ABSTRACT

A display method comprises applying electrical energy to a display layer formed of a monomolecular film or a monomolecular-layer built-up film of a clathrate complex compound composed of a host molecule having a hydrophilic portion, a hydrophobic portion and a portion to enclose a guest molecule, and a guest molecule on a substrate, thereby making a display.

The display may be made by color-forming or light emitting due to reduction of the guest molecules.

13 Claims, 1 Drawing Sheet

4,773,742

DISPLAY METHOD WITH FATLY ACID ESTER HOST MOLECULE

BACKGROUND OF THE INVENTION

1. Field of the Invention

This invention relates to a display method utilizing chemical changes or physical changes of monomolecular films or monomolecular layer built-up films of clathrate complexes.

2. Description of the Prior Art

Heretofore, as display mediums comprising an organic compound display layer, there have been known, for example, display mediums using organic compounds capable of forming color by redox reactions (electrochromic materials), those using fluorescent organic compounds capable of emitting light by redox reactions, and the like.

As display mediums using electrochromic materials, there are proposed various ones, for example, those disclosed in Japanese patent application laid-open Nos. 71380/1973, 32958/1975, 63950/1975 and 136000/1975.

In these conventional mediums, viologen derivatives are used as electrochromic materials, and the derivatives are dissolved in appropriate electrolytic solutions to produce color forming display layers capable of forming color by applying voltage. These are so-called organic EC (electrochromic) display elements. The color forming patterns follow the shapes of electrodes forming organic EC elements. However, in the case of the above-mentioned organic EC elements, the electrochromic materials are dissolved in electrolytic solutions and therefore, the degree of freedom is so large that the response characteristics (time required for color forming or color erasing after applying voltage) is poor. As the result, the organic EC elements can not be high density color forming elements. In addition, colored substances precipitated on electrodes are dissolved again in a solvent (electrolytic solution) so that the memory time is short and the reversibility (color forming and color erasing process) is poor. In order to resolve such drawbacks of the conventional elements, it is necessary that the above-mentioned electrochromic materials are attached to the pattern-like electrodes constituting the display elements with a high orderliness.

Various luminous display elements using fluorescent organic compounds are proposed, for example, Japanese patent application laid-open Nos. 35587/1977 and 172891/1983. These conventional ones are all concerned with EL (electroluminescence) luminous display elements having a luminous display layer composed of an electroluminescent compound and capable of emitting light by applying voltage. In particular, the elements disclosed in Japanese patent application laid-open No. 35587/1977 are constituted of a monomolecular film or a built-up film thereof composed of a derivative of anthracene, pyrene or perylene having a hydrophilic group and a hydrophobic group at appropriate positions formed on an electrode plate and a second electrode deposited on the film. In order to produce a display element of high resolution, it is desired that the distribution of luminous molecules in the film is of high orderliness. However, when the above-mentioned derivatives of anthracene and the like are used for forming a monomolecular film or a built-up film thereof having high orderliness, there are disadvantageously required careful and complicated procedures. In addition, there are also disadvantageously required fairly complicated procedures for preparing derivatives of anthracene and the like which are molecules constituting the above-mentioned monomolecular film or built-up film thereof ("Thin Solid Film", Vol. 99, pages 71–79, 1983).

SUMMARY OF THE INVENTION

The present inventors have made efforts to solve the above-mentioned drawbacks and made researches on (1) methods for fabricating various functional film relatively simply, (2) methods for exhibiting various functions of functional molecules without loss or lowering thereof even when the molecules are arranged in a thin film, and further (3) methods for orienting film-constituting molecules in the direction of film plane with a highly ordered structure without any particular procedures upon the above-mentioned formation of the thin film, resulting in the present invention.

An object of the present invention is to provide a displaying method where there is used a display medium of high quality, high sensitivity and high resolution and capable of being easily produced.

Another object of the present invention is to provide a displaying method in which a high density display medium capable of displaying by color formation or light-emitting caused by chemical or physical change at each molecule unit due to electric energy.

A further object of the present invention is to provide a display method where a medium excellent in molecular orientation within the medium plane which is an important factor upon high density display at such molecule unit.

Still another object of the present invention is to provide a display method where the display medium capable of being easily produced and having various characteristics is used.

Figure 1:
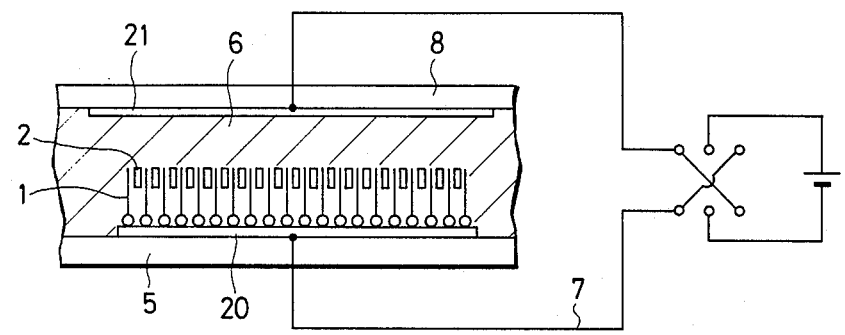
FIG. 1 shows a vertical cross section of an embodiment of a color forming display medium of the present invention.

According to one aspect of the present invention, there is provided a display method, which comprises applying electrical energy to a display layer formed of a monomolecular film or a monomolecular-layer built-up film of a clathrate complex compound composed of a host molecule having a hydrophilic portion, a hydrophobic portion and a portion to enclose a guest molecule, and a guest molecule on a substrate, thereby making a display.

According to another aspect of the present invention, there is provided a display method, which comprises applying electrical energy to a display layer formed of a monomolecular film or a monomolecular-layer built-up film of a clathrate complex compound composed of a host molecule having a hydrophilic portion, a hydrophobic portion and a portion to enclose a guest molecule, and a sublimable guest molecule on a substrate, thereby reducing the guest molecules to make a color-forming display.

According to a further aspect of the present invention, there is provided a display method, which comprises applying electrical energy to a display layer formed of a monomolecular film or a monomolecular-layer built-up film of a clathrate complex compound composed of a host molecule having a hydrophilic portion, a hydrophobic portion and a portion to enclose a guest molecule, and a guest molecule on a substrate, thereby reducing the guest molecules selectively to make a light-emitting display.

DETAILED DESCRIPTION OF THE PREFERRED EMBODIMENTS

The material constituting the display layer used for the present invention comprises two species of molecules, one having a hydrophilic group, a hydrophobic group, and at least one portion capable of enclosing a molecule of other species in each molecule (this type of molecule is called a host molecule) and the other being a different species of molecules each molecule of which is enclosed in the host molecule (this type of molecule is called a guest molecule). The display medium used for the present invention is produced by forming a monomolecular film or monomolecular-layer built-up film of a clathrate complex compound which is composed of such host molecules and guest-molecules. However, it is required that external causes, such as light, heat, electricity, magnetism and the like, give chemical or physical changes to at least one of two species of molecules to develop color or to emit light.

Any host molecule can be used in the present invention that has a hydrophilic group, a hydrophobic group, and at least one portion capable of enclosing a different molecule to form a clathrate complex compound, at suitable positions therein. Typical example of the hydrophilic group and hydrophobic group are those widely known. The portion capable of enclosing a molecule of different species to form a clathrate complex compound can be constructed by introduction of a hydroxyl, carbonyl, carboxyl, ester, amino, nitrile, mercapto or imino group. Such host molecules are illustrated below by exemplifying hydroxyl-group-carrying host molecules represented by the following formula (Ia) to (Ic).

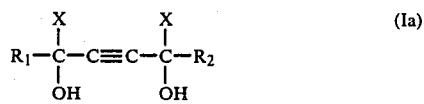

(Ia)

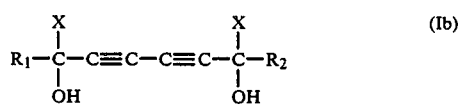

(Ib)

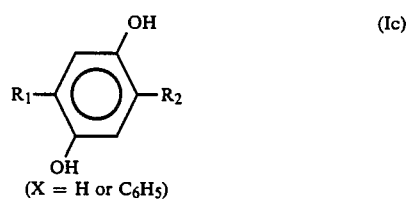

(Ic)

(X = H or C₆H₅)

The words "having a hydrophilic group and a hydrophobic group in the molecule" means that, for example, in the above formulae, either of $R_1$ and $R_2$ is a hydrophilic group and the other is hydrophobic group or both $R_1$ and $R_2$ are hydrophilic or hydrophobic compared with the remainder portion of the molecule. Particularly preferred hydrophobic groups as $R_1$ or $R_2$ in the above formulae are long chain alkyls of 5 to 30 carbon atoms, and particularly preferred hydrophilic groups as $R_2$ or $R_1$ are fatty acid residues of 1 to 30 carbon atoms.

Suitable host molecules used in the present invention include, for example, the following acetylenediol derivatives (Nos. 1-6, Nos. 16-21), diacetylenediol derivatives (Nos. 7-12, Nos. 22-27), and hydroquinone derivatives (Nos. 13-15, Nos. 28-30) and the like. In the following formulae, m and n are positive integers, Z is —CH₃ or —COOH, and Ph is —C₆H₅.

[Acetylene diol derivatives]

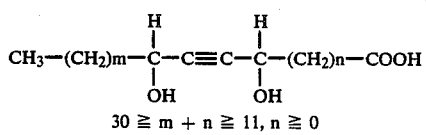

No. 1

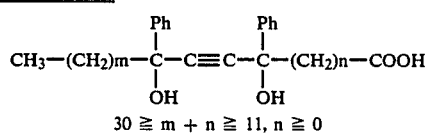

No. 2

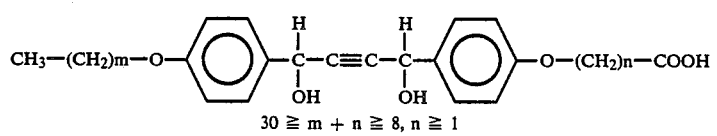

No. 3

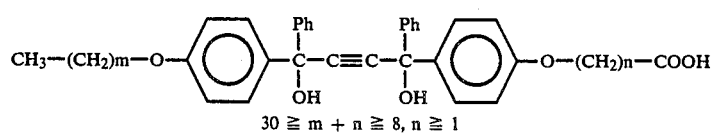

No. 4

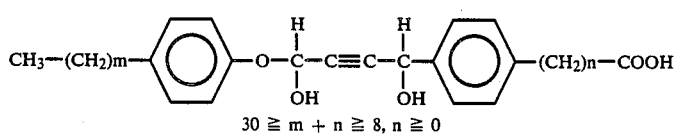

No. 5

-continued

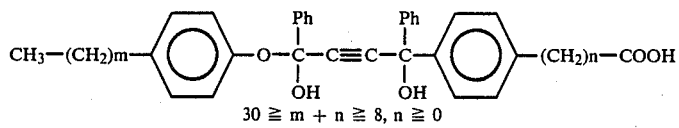
No. 6

$30 \geq m + n \geq 8, n \geq 0$

[Diacetylene diol derivatives]

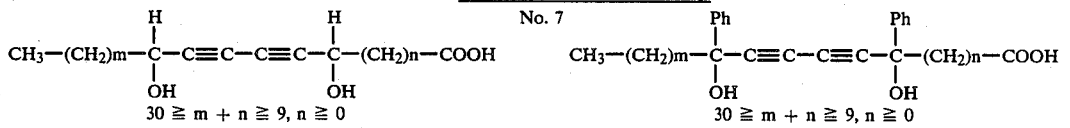
No. 7      No. 8

$30 \geq m + n \geq 9, n \geq 0$      $30 \geq m + n \geq 9, n \geq 0$

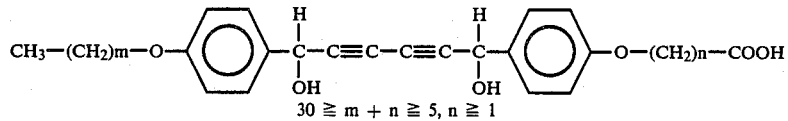
No. 9

$30 \geq m + n \geq 5, n \geq 1$

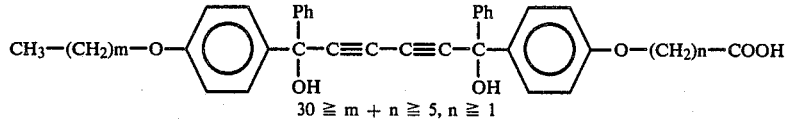
No. 10

$30 \geq m + n \geq 5, n \geq 1$

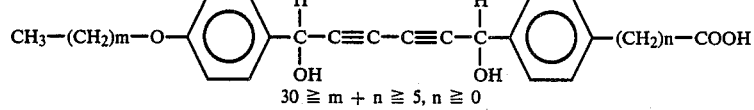
No. 11

$30 \geq m + n \geq 5, n \geq 0$

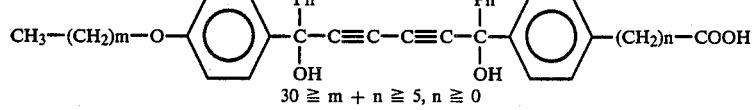
No. 12

$30 \geq m + n \geq 5, n \geq 0$

[Hydroquinone derivatives]

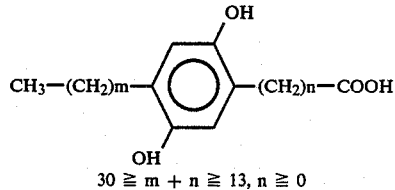
No. 13

$30 \geq m + n \geq 13, n \geq 0$

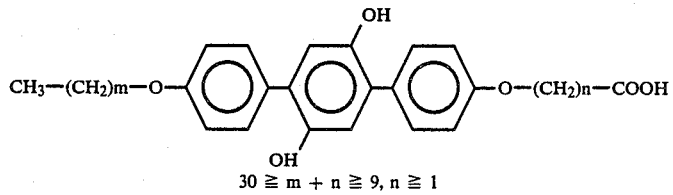
No. 14

$30 \geq m + n \geq 9, n \geq 1$

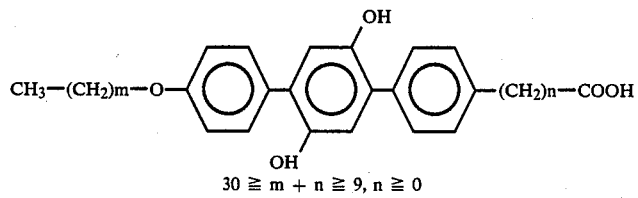
No. 15

$30 \geq m + n \geq 9, n \geq 0$

[Acetylene diol derivatives]

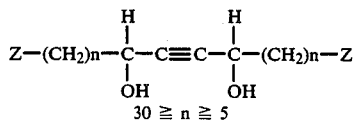      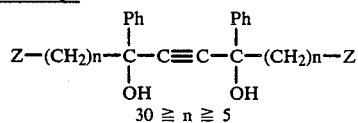
No. 16      No. 17

$30 \geq n \geq 5$      $30 \geq n \geq 5$

-continued
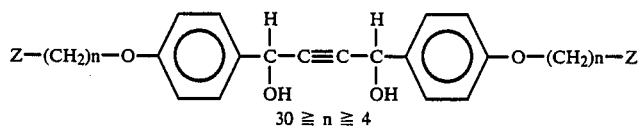 No. 18
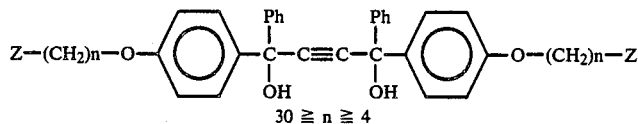 No. 19
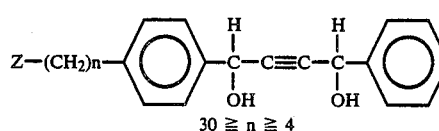 No. 20
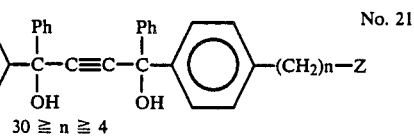 No. 21
[Diacetylene diol derivatives]
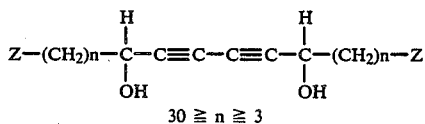 No. 22
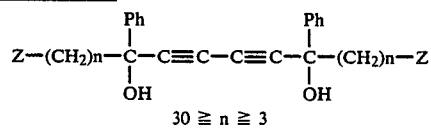 No. 23
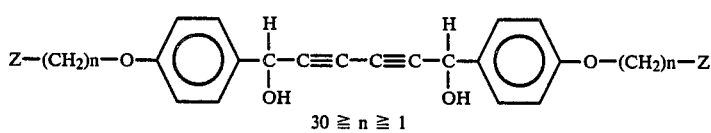 No. 24
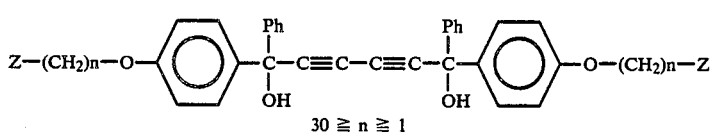 No. 25
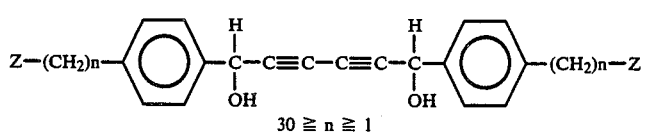 No. 26
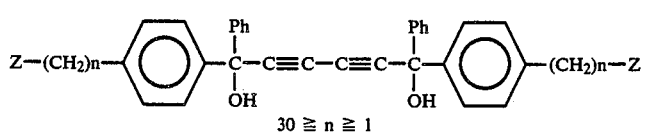 No. 27
[Hydroquinone derivatives]
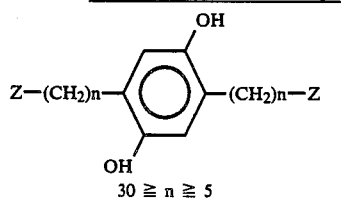 No. 28
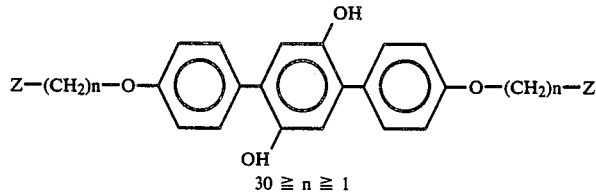 No. 29

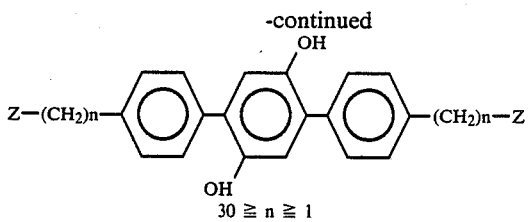

No. 30

$30 \geqq n \geqq 1$

The above cited compounds before substitution by long chain alkyls or long chain carboxylic acid residues as hydrophobic groups or hydrophilic group are known compounds. It is also described in Nihon Kagaku Kaishi (Bulletin of the Chemical Society of Japan), 1983, No. 2, pp. 239-242 that the above host molecules, before modification by long-chain alkyls or the like residues, together with various guest molecules form crystalline clathrate complex compounds.

For the formation of clathrate complex compounds by combining with the above cited host compounds, it is generally desirable to use a guest compound which can form a strong hydrogen bond with a host compound. Accordingly, when the host compound to be used has hydroxyl(s), as stated above, in the portion to enclose a guest molecule, suitable guest compounds are, for example, aldehyde, ketone, amine, sulfoxide compounds and the like. Other acceptable guest compounds are various halogen compounds and π-electron compounds such as alkanes, alkynes, and allenes. Anyway, the guest molecules, clathrate compound of which have a structure with color formation display function, include molecules which exhibit color formation by a redox reaction such as viologen (No. 31), tetrathiofulvalene (No. 32), and the like shown below.

No. 31

$R \overset{+}{-} N \diagup\!\!\!\diagdown \diagup\!\!\!\diagdown N \overset{+}{-} R.2X^-$ (R = —CH₃ or C₂H₅, X⁻ = —Br⁻, Cu⁻, I⁻, or ClO₄⁻)

No. 32

As guest compounds whose calthrate complex compounds exhibit a light-emitting display function, there may be mentioned molecules capable of emitting light by a redox reaction, such as polycyclic aromatic hydrocarbons (No. 33–No. 41) and the like as shown below.

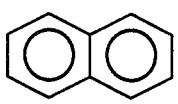

No. 33

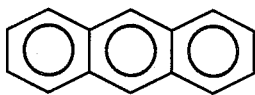

No. 34

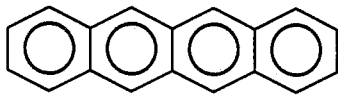

No. 35

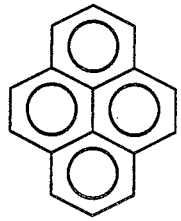

No. 36

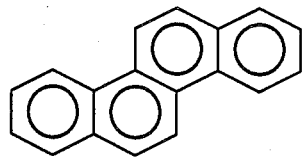

No. 37

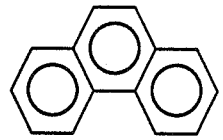

No. 38

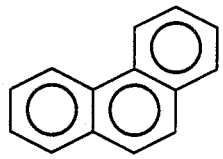

No. 39

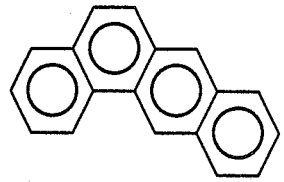

No. 40

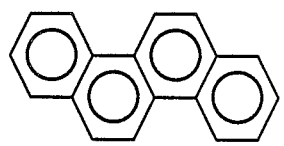

No. 41

Films of clathrate complex compounds composed of such host molecules and guest molecules as cited above are formed, for example, according to the Langmuir-Blodgett method (LB method) developed by I. Langmuir et al., which is generally known as a method for making monomecular films or monomecular-layer built-up films. The LB method utilizes the fact that molecules each having a hydrophilic group and a hydrophobic group, where the hydrophilicity and the hydrophobicity are suitably balanced, form a monomolecular layer on a water surface with the hydrophilic groups being directed downward. The monomolecular layer on the water surface has characteristics of a two-dimensional system. When the molecules are sparsely scattered, a relation represented by the equation of two-dimensional ideal gas $$\pi A = kT$$

exists between the surface pressure $\pi$ and the surface area A of each molecule (k: Boltzman's constant; T: absolute temperature). The layer in this state is called "a gas film". When A is reduced sufficiently, the molecular interaction increases and the layer becomes a "condensed film or solid film", namely, a two-dimensional solid. This condensed film can be transferred one by one onto substrates of various materials and shapes including glass plates and the like. The following five processes A to E can be given as examples of the method of the invention for forming a monomolecular film of host molecules containing guest molecules (hereinafter this film is referred to as a complex monomolecular film) or a complex monomolecular-layer built-up film by utilizing the LB method.

Figure 3A:
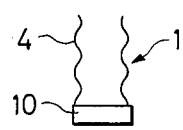
FIGS. 3 and 4 diagrammatically show the states of a clathrate complex according to the present invention on a water phase.
Figure 3B:
Figure 3C:
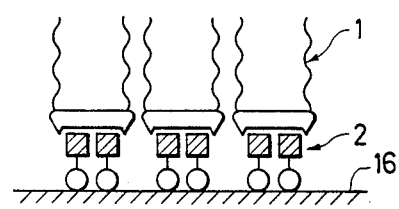

[A] Host molecules and guest molecules, capable of forming an intended clathrate complex, are dissolved in a solvent. The resulting solution is extended on a water surface to deposit the clathrate complex compound in a film form on the water surface. When the host molecule in this case has a hydrophilic group (carboxyl) at one end thereof and a hydrophobic group (alkyl) at the other end as shown in host molecules Nos. 1-15, the clathrate complex compound extended on the water surface directs the hydrophilic group of the host molecule towards the water regardless of the hydrophilicity and hydrophobity of the guest molecule. On the other hand, when the host molecule 1 has a structure as the above cited Nos. 16-30 and both the ends thereof are constructed of hydrophobic groups $Z=-CH_3$ only, the clathrate complex compounds extended on the water surface directs the hydrophilic groups 3 of the guest molecule 2 towards the water surface 16 as shown in FIG. 3. When both the ends of the host molecule are constructed of hydrophilic groups $Z=-COOH$ only the clathrate complex compound extended on the water surface directs the hydrophilic groups of the host molecule towards the water surface 16 as shown in FIG. 4.

Figure 4A:
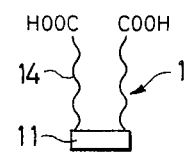
Figure 4B:
Figure 4C:
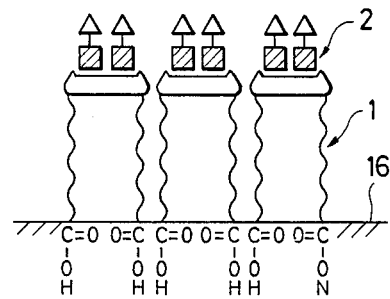

In FIG. 3 and FIG. 4, 4 may be a long chain alkyl group, 10 and 11 are a clathrate portion; 12 and 13 are a portion trapped in the clathrate portion; 14 is a long chain fatty acid portion; and 15 is a hydrophobic portion.

Then a partition plate or float is set on the water surface so that the clathrate complex compound will not so freely diffuse on the water surface as to spread excessively, that is, the aggregation state of the clathrate complex compound is controlled to restrict the extension area thereof. Thus, the clathrate complex compound acquires a surface pressure $\pi$ in proportion to the degree of the aggregation. The partition plate is then gradually moved to narrow the extension area of the clathrate complex compound and raise the surface pressure to a suitable value for the production of the complex monomolecular film or built-up film. While this surface pressure is maintained, a clean-surface substrate is moved gently across the monomolecular layer of the clathrate complex compound, (vertical dipping method). Thereby the monomolecular layer is transferred onto the substrate. A built-up film consisting of a desired number of complex monomolecular layers is formed by repeating the above procedure.

The complex monomolecular layer on a water surface can be transferred not only by the vertical dipping method but also by the horizontal contact method and the cylinder rotation method mentioned above. According to the vertical dipping method, with a substrate having a hydrophilic surface taken up from the water across the condensed film, a complex monomolecular film is formed on the hydrophilic surface of the substrate with the hydrophilic groups of the host molecules being directed towards the substrate. On moving the substrate up and down as stated above, one complex monomolecular layer is built up by each movement. The orientation direction of the molecules in each built-up layer formed in the uptake step is opposite to that in each layer formed in the immersing step. Therefore the vertical dipping method gives a Y-type built-up film, in which the hydrophilic groups of the host molecules in adjacent layers confront with each other and also hydrophobic groups of the host molecules in adjacent layers confront with each other. In contrast to this, the horizontal contact method is carried out by horizontally contacting the substrate with the water surface to transfer the complex monomolecular layer and forms a complex monomolecular layer on a substrate with the hydrophobic groups of the host molecules being directed to the substrate. The successive building-up of monomolecular layers by this method results in no turnover of molecular orientation direction but forms an X-type built-up film, in all the layers of which the hydrophobic groups are directed to the substrate. On the contrary, the built-up film in all the layer of which the hydrophilic groups are directed towards the substrate is called the Z-type built-up film.

The monomolecular layer on the water surface can also be transferred onto a substrate by the cylinder rotation method where a cylindrical substrate is rotated on the water surface. However, the way to transfer the condensed film to a substrate is not limited to the above three methods. When large area substrate are employed, another possible method is to unwind a roll of substrate and introduce the substrate in the form of continuous sheet into water. In addition, the above described directions of hydrophilic groups and hydrophobic groups relative to substrates are true as a general rule; these directions can be changed by surface treatment of the substrate.

In the film-forming process, the orientation of molecules in the film has been controlled mainly by regulating the surface pressure up to now. According to this method, it is very difficult to obtain a film of highly ordered molecular orientation unless the film material is a considerably simple compound, for example, a linear fatty acid. According to the invention, however, highly ordered films can be obtained relatively easily since clathrate complex compounds are used as film materials.

In the monomolecular layer of clathrate complex compound formed on a water surface, the steric arrangement of host-to-host molecules, host-to-guest molecules, and guest-to-guest molecules are fixed depending on hydrogen bonds or van der Waals' forces therebetween and these host and guest molecules are arranged in an ordered state like in a crystal lattice. When the guest molecule alone has a special function, no chemical modification of the guest molecule, i.e., no introduction of hydrophilic or hydrophobic group, is necessary and hence the deterioration of the film function caused by such a film preparation process does not occur.

[B] A solution of host molecules in a solvent is extended on the surface of water in which water soluble guest molecules have been dissolved. The host molecules enclose the guest molecules to form a clathrate complex compound, which appears in film form on the water surface. The combination of host and guest molecules and the film formation procedure thereafter are as shown in [A] above.

[C] Host molecules and guest molecules which will constitute an intended clathrate complex compound are dissolved in a solvent, and extended on the surface of water in which water soluble guest molecules have been dissolved, thereby forming a film of the clathrate complex compound on the water surface. The combination of the host and the guest molecules and the film formation procedure thereafter are as shown in [A] above.

[D] A solution of host molecules in a solvent is extended on the water surface. Then the upper space in a closed vessel containing water is filled with a guest molecule gas. Then, host molecules take guest molecules in from the gas phase to form a film of clathrate complex compound on the water surface. This method is effective especially for the readily vaporizable guest compound having a low boiling point such as acetone and the like. The combination of host and guest molecules and the film formation procedure thereafter are as shown in [A] above.

[E] The gas phase, i.e. upper space atmosphere in a close vessel containing water is supplied with a guest molecule gas. Host molecules and guest molecules which will constitute an intended clathrate complex compound are dissolved in a solvent, and extended on the water surface to form a film of the clathrate complex compound. The combination of host and guest molecules and the film formation procedure thereafter are as shown in [A] above.

Complex monomolecular films and complex monomolecular-layer built-up films formed on substrates by the above described processes have high densities and high degrees of order. Using these films as color-forming layers, display media having color-forming display function, and giving high-density images with high degrees of resolution, can be obtained.

The film-forming can be very easily carried out by the above methods as understood from the principles. The above display media having the excellent color-forming display function can be provided at a low cost.

An example of such a display medium is illustrated in FIG. 1, and the present invention is described in more detail with reference to the drawings.

FIG. 1 shows an example of a display medium comprising a color display layer utilizing the color formation due to the oxidation-reduction reaction of guest molecules.

A clathrate compound is formed by combining, for example, any of host compounds No. 1–No. 30 (host molecule 1) with any of guest compounds No. 31, No 32 and the like (guest molecule 2). A display layer composed of a monomolecular film or built-up film of the clathrate complex compound is formed on an electrode 20 supported by a substrate 5 (a flat plate in this case). In place of substrate 5 and electrode 20, it is possible to use another substrate which serves also as an electrode. A cell 8 is formed, in which an electrolyte solution 6 is poured so as to cover the film. Then a counter electrode 21 insulated from electrode 20 (display electrode) is provided at a part of the cell 8, thus completing a display medium. The electrode 21 may constitute a part of the substrate 5. In this display medium, both or one of the substrate 5 and the cell 8 needs to be formed of a transparent material (e.g. glass) and the electrode adhering to the transparent member needs to be transparent. On applying a d.c. voltage to the thus formed display medium with the display electrode 20 as cathode and the counter electrode 21 as anode, guest molecules are reduced to develop color (7 is a conductive wire). When the guest compound is viologen (No. 31), this reduction proceeds as follows:

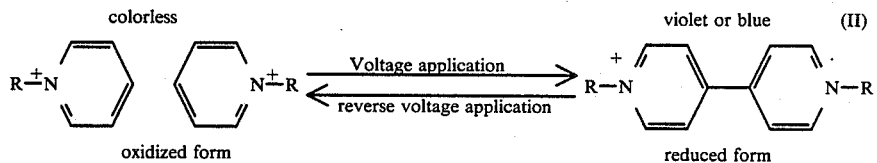

Consequently, a colored pattern can be displayed when the display electrode 20 has been fabricated into a pattern form. A d.c. voltage in the reverse direction is applied to erase color. The thickness of the display layer is preferably in the rang of 100 to 500 Å.

Figure 2:
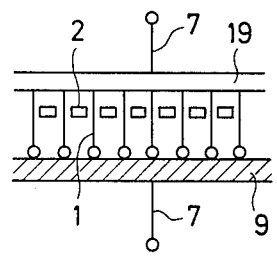
FIG. 2 shows a vertical cross section of an embodiment of a luminous display medium of the present invention.

FIG. 2 shows an example of a display medium comprising a luminescent display layer utilizing luminescence by oxidation-reduction reaction of guest molecules.

A clathrate complex compound is formed by combining, for example, any of host compounds No 1–No. 30 (host molecule 1) with any of guest compounds No. 33–No. 41 (guest molecule 2) capable of exhibiting electroluminescence. A display layer comprising a monomolecular film or built-up film of the clathrate complex compound is formed on a substrate 9 (a flat plate in this case) which can serve also as an electrode. Then, the film is covered with another electrode plate 19. At least one of the two electrodes is made of a transparent material. On passing an electric current through the thus formed display medium, guest molecules on the cathode side are reduced to emit light.

Consequently, a luminous pattern can be displayed when one of the electrodes has been formed according to a pattern and a voltage is applied between the electrodes.

The thickness of the display layer is preferably in the range of 3000 to 10,000 Å.

In the above described embodiments of the invention, the substrate for supporting the complex monomolecular film or built-up film is not particularly restricted. But the surface of the substrate must be cleaned since a surface active material, if attached to the substrate surface, will disorder the complex monomolecular film when it is transferred from a water surface thus causing disorder of the complex monomolecular film and preventing the formation of a good complex monomolecular film or built-up film. Suitable materials for the substrate are, for example, glasses, metals such as aluminum and the like, plastics and ceramics.

The complex monomolecular film or built-up film is fixed strongly enough so that the flaking or scaling of the film from the substrate scarcely occurs. However, an adhesion layer may be provided between the substrate and the film or between the layers of the built-up film for the purpose of further enhancing the adhesion. The adhesion can also be enhanced by proper selection of conditions in the formation of the complex monomolecular layer on a water surface, for example, the pH and ion species in the water, the water temperature, the speed of substrate uptake or sinking, and the surface pressure.

It is favorable to cover the monomolecular film or built-up film with a protective film for improving the chemical stability of the recording medium, though the protective film may be unnecessary depending on the film-constituting molecules chosen. The invention is illustrated more in detail with reference to the following examples. Compounds No. 61–No. 65 used in the following examples are shown in Table 1 (infra).

EXAMPLE 1

A display medium shown in FIG. 1 was prepared and a display was made by using it.

Any of No. 61–No. 65 as host compound and methyl viologen were dissolved at a molar ratio of 1:1 in chloroform, and then the solution was extended on the surface of a $4\times10^{-4}$ mol./l aqueous solution (pH 6.5) of cadmium chloride. After removal of chloroform by vaporization, the film of the clathrate complex compound was formed by raising the surface pressure to 35 dynes/cm. While keeping this surface pressure constant, a complex monomolecular film or built-up film was transferred onto a transparent electrode (display electrode) 20 supported by a glass substrate 5 by reciprocating it gently in the vertical direction at a speed of 2 cm/min across the monomolecular layer. Thus, a complex monomolecular film or built-up film was formed as a display layer on the electrode. Then a gold counter electrode 21 was prepared in such a manner as to surround the display electrode 20, and a cell 8 made of glass plate was prepared in such a manner as to cover these electrodes with the room therein filled with an electrolyte solution (aqueous 0.3 mol./l KBr solution) 6. In this way display media were prepared.

On applying an 8 V d.c. voltage to each display medium with the display electrode 20 as a cathode, a blue color developed in the shape of the display electrode 20 in the film. In particular, satisfactory color formation was observed in the display media of 5- to 21-layered built-up films. The color disappeared on application of a reverse voltage. These display media were found to withstand at least 5000 color formation-disappearance cycles.

Display media prepared in various patterns by following the above procedure, gave high-density images with high degrees of resolution in all cases.

EXAMPLE 2

A display media shown in FIG. 2 was prepared and a display was made by using it.

Each of No. 61–No. 65 (host compound) and anthracene (No. 34) were dissolved in a molar ratio of 1:1 in chloroform, and then, the solution was extended on the surface of a $4\times10^{-4}$ mol./l aqueous solution (pH 6.5) of cadmium chloride. After removal of the solvent chloroform by vaporization, the film of the clathrate complex compound was formed by raising the surface pressure to 30 dynes/cm. While keeping this surface pressure constant, the complex monomolecular layer was transferred onto an NESA glass base plate 9 which acts as a transparent electrode, by reciprocating the plate gently in the vertical direction at a speed of 0.7 cm/min across the monomolecular layer. In this way, a complex monomolecular film and built-up films of 9, 19, 51, 101, 201 and 401 complex monomolecular layers were prepared respectively as a display layer on the electrode. The film sides of the resulting laminates were overlaid with vapor deposition with aluminum 10 of 300 Å in thickness which acts as a counter electrode, thus preparing display media.

On applying a d.c. or a.c. voltage of 45 V to these display media, blue luminescence was observed in the display layer. This luminescence disappeared on removing the voltage. In particular, intense luminescence was observed in the display media of built-up films of 101 layers and more.

Display media different in the pattern of display electrode, prepared by following the above procedure, gave high-density images with high degrees of resolution in all cases.

TABLE 1

| | Host compounds used | |
|---|---|---|
| Compound No. | Skeletal base compound No. | Notations |
| 61 | 25 | Z = COOH, n = 2 |
| 62 | 15 | m = 9, n = 2 |
| 63 | 30 | Z = COOH, n = 4 |
| 64 | 7 | m = 8, n = 8, |
| 65 | 4 | m = 9, n = 2 |

As described hereinbefore, display media capable of displaying with high-density images and high degrees of rsolution which may be used for the present invention can be provided with low cost. Furthermore, these media of high quality can be provided with ease.

What is claimed is:

1. A display method which comprises applying electrical energy to a dispaly layer formed of a monomolecular film or a monomolecular-layer built-up film of a clathrate complex compound composed of a host molecule comprising a fatty acid residue as a hydrophilic portion with the carboxyl group thereof at the end of the hydrophilic portion, a long-chain alkyl as a hydrophobic portion and a portion having a group for enclosing a gueest molecule, and a guest molecule enclosed therein, on a substrate, said group for enclosing a guest molecule being selected from hydroxyl, carbonyl, carboxyl, ester, amino, nitrile, thioalcohol and imino radicals, thereby making a display.

2. The display method of claim I, wherein the guest molecule is viologen or tetrathiofulvalene.

3. The dispaly method of claim 1, wherein the guest molecule is a fused polycyclic aromatic hydrocarbon.

4. A display method, which comprises applying electrical energy to a display layer formed of a monomolecular film or a monomolecular-layer built-up film of a clathrate complex compound composed of a host molecule comprising a fatty acid residue as ahydrophilic portion with the carboxyl group thereof at the end of the hydrophilic portion, a long-chain alkyl as a hydrophobic portion, and a portion having a group for enclosing a guest molecule, and a sublimable guest molecule on a substrate, said group for enclosing a guest molecule being selected from hydroxyl, carbonyl, carboxyl, ester, amino, nitrile, thioalcohol and imino radicals, thereby reducing the guest molecules to make a color-forming display.

5. A display method, which comprises applying electrical energy to a display layer formed of a monomolecular film or a monomolecular-layer built-up film of a clathrate complex compound composed of a host molecule comprising a fatty acid residue as a hydrophilic portion with the carboxyl group group thereof at the end of the hydrophilic portion, a long-chain alkyl as a hydrophobic portion, and a portion having a group for enclosing a guest molecule, and a guest molecule on a substrate, said group for enclosing a guest molecule being selected from hydroxyl, carbonyl, carboxyl, ester, amino, nitrile, thioalcohol and imino radicals, thereby reducing the guest molecules selectively to make a light-emitting display.

6. The display method of claim 5, wherein the thickness of the display layer is in the range of 3000 to 10,000 Å.

7. The display method of claim 4, wherein the thickness of the dispaly layer is in the range of 100 to 500 Å.

8. The display method of claim 1, wherein the portion having a group for enclosing a guest molecule is selected from the group consisting of

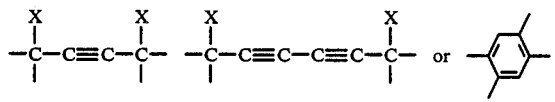

wherein X is H or $C_6H_5$.

9. The display method of claim 1, wherein the hydrophilic group is —COOH.

10. The display method of claim 1, wherein the hydrophobic group has 5–30 carbon atoms.

11. The display method of claim 1 wherein the host molecule is represented by the general formula (Ia) below:

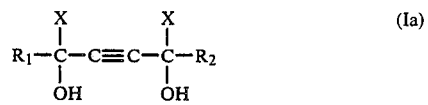

wherein X is H or $C_6H_5$; $R_1$ is a fatty acid residue having a carboxyl group; and $R_2$ is long-chain alky.

12. The display method of claim 1, wherein the host molecule is represented by the general formula (Ib) below:

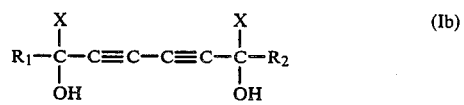

wherein X is H or $C_6H_5$; $R_1$ is a fatty residue having a carboxyl group; and $R_2$ is long-chain alkyl.

13. The display method of claim 1, wherein the host molecule is represented by the general formula (Ic) below:

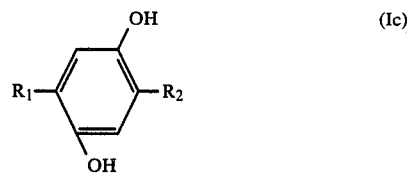

wherein $R_1$ is a fatty acid residue having a carboxyl group; and $R_2$ is long-chain alkyl.

* * * * *

UNITED STATES PATENT AND TRADEMARK OFFICE
CERTIFICATE OF CORRECTION

PATENT NO. : 4,773,742

DATED : September 27, 1988

INVENTOR(S) : HIROSHI MATSUDA, ET AL.

It is certified that error appears in the above-identified patent and that said Letters Patent is hereby corrected as shown below:

ON THE TITLE PAGE,

IN [54] TITLE

"FATLY" should read --FATTY--.

COLUMN 1

Line 1, "FATLY" should read --FATTY--.

COLUMN 2

Lines 38-48, Move the text beginning with "BRIEF DESCRIPTION OF THE DRAWINGS" and ending with "on a water phase." to Column 3 after Line 10 and before "DETAILED DESCRIPTION OF THE PREFERRED EMBODIMENTS".

COLUMN 3

Line 35, "example" should read --examples--.

COLUMN 4

Line 3, "formula" should read --formulae--.

COLUMN 4

Formulas 2-5, "No.     should read     --No. 2
              No.                        No. 3
              No.                        No. 4
              No."                       No. 5--.

UNITED STATES PATENT AND TRADEMARK OFFICE
CERTIFICATE OF CORRECTION

PATENT NO. : 4,773,742
DATED : September 27, 1988
INVENTOR(S) : HIROSHI MATSUDA, ET AL.

It is certified that error appears in the above-identified patent and that said Letters Patent is hereby corrected as shown below:

COLUMN 9

Line 13, "groups" should read --group--.
Line 41, "Cu⁻," should read --Cl⁻,--.

COLUMN 10

Line 62, "monomecular" should read --monomolecular-- and "monomecu-" should read --monomolecu- --.

COLUMN 11

Line 9, "Boltzman's" should read --Boltzmann's--.
Line 34, "hydrophobility" should read --hydrophobicity--.
Line 38, "compounds" should read --compound--.

COLUMN 12

Line 33, "layer" should read --layers--.

COLUMN 13

Line 25, 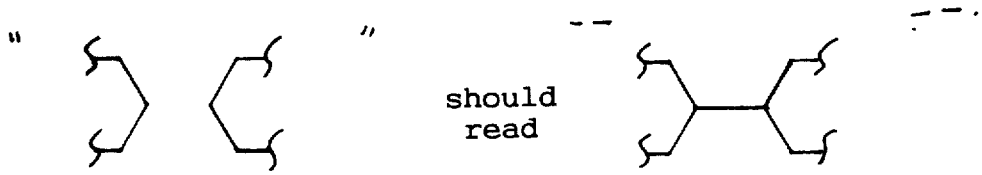 should read

UNITED STATES PATENT AND TRADEMARK OFFICE
CERTIFICATE OF CORRECTION

PATENT NO. : 4,773,742
DATED : September 27, 1988
INVENTOR(S) : HIROSHI MATSUDA, ET AL.

It is certified that error appears in the above-identified patent and that said Letters Patent is hereby corrected as shown below:

COLUMN 13

Line 40, "close" should read --closed--.

COLUMN 14

Line 35, "rang" should read --range--.

COLUMN 15

Line 58, "procedure," should read --procedure--.
Line 62, "media" should read --medium--.

COLUMN 16

Line 38, "rsolution" should read --resolution--.
Line 43, "dispaly layer" should read --display layer--.
Line 51, "gueest molecule," should read --guest molecule,--.
Line 56, "claim I," should read --claim 1,--.
Line 58, "dispaly method" should read --display method--.
Line 64, "ahydrophilic" should read --a hydrophilic--.

COLUMN 17

Line 12, "carboxyl group group" should read --carboxyl group--.
Line 26, "dispaly layer" should read --display layer--.

UNITED STATES PATENT AND TRADEMARK OFFICE
CERTIFICATE OF CORRECTION

PATENT NO. : 4,773,742
DATED : September 27, 1988
INVENTOR(S) : HIROSHI MATSUDA, ET AL.

It is certified that error appears in the above-identified patent and that said Letters Patent is hereby corrected as shown below:

COLUMN 18

Line 3, "claim 1" should read --claim 1,--.
Line 13, "long-chain alky." should read --long-chain alkyl.--.
Line 23, "fatty residue" should read --fatty acid residue--.

Signed and Sealed this

Twenty-sixth Day of November, 1991

Attest:

HARRY F. MANBECK, JR.

*Attesting Officer*     *Commissioner of Patents and Trademarks*